United States Patent
Srivastava et al.

(10) Patent No.: US 12,126,712 B2
(45) Date of Patent: *Oct. 22, 2024

(54) SYSTEM AND METHOD FOR MITIGATING INTERNATIONAL REVENUE SHARE FRAUD

(71) Applicants: Emory University, Atlanta, GA (US); AT&T Intellectual Property I, L.P., Atlanta, GA (US)

(72) Inventors: Divesh Srivastava, Summit, NJ (US); Yaron Kanza, Fair Lawn, NJ (US); Tamraparni Dasu, New Vernon, NJ (US); Teddy Chu, Dallas, TX (US); Shuaicheng Ma, Orlando, FL (US); Li Xiong, Atlanta, GA (US)

(73) Assignees: Emory University, Atlanta, GA (US); AT&T Intellectual property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,164

(22) Filed: May 24, 2023

(65) Prior Publication Data
US 2023/0299945 A1    Sep. 21, 2023

Related U.S. Application Data

(63) Continuation of application No. 17/315,620, filed on May 10, 2021, now Pat. No. 11,706,023.

(51) Int. Cl.
*H04L 29/06* (2006.01)
*H04L 9/08* (2006.01)
(Continued)

(52) U.S. Cl.
CPC ............ *H04L 9/0833* (2013.01); *H04L 9/085* (2013.01); *H04L 9/0861* (2013.01); *H04L 9/3239* (2013.01); *H04L 9/50* (2022.05)

(58) Field of Classification Search
CPC ..... H04L 9/0833; H04L 9/085; H04L 9/0861; H04L 9/3239; H04L 9/50; H04L 63/00;
(Continued)

(56) References Cited

U.S. PATENT DOCUMENTS 5,241,598 A * 8/1993 Raith ............... H04L 9/16
455/433
6,363,411 B1 * 3/2002 Dugan ............... H04M 15/90
709/202

(Continued)

FOREIGN PATENT DOCUMENTS

CN        108769029 B  *  3/2021   ........... G06Q 20/401
WO   WO-2013184528 A2  *  12/2013   ............. G01C 21/26

OTHER PUBLICATIONS

Dasu, Tamraparni, et al., "Unchain Your Blockchain", Symposium on Foundations and Applications of Blockchain, Mar. 9, 2018, 8 pages.
Shamir, Adi, et al., "How to Share a Secret", Programming Techniques; Communications of the ACM; vol. 22, No. 11, Nov. 1979, 2 pages.

*Primary Examiner* — Mahfuzur Rahman
(74) *Attorney, Agent, or Firm* — Guntin & Gust, PLC; Robert Gingher

(57) ABSTRACT

Aspects of the subject disclosure may include, for example, a non-transitory, machine-readable medium, comprising executable instructions that, when executed by a processing system including a processor, facilitate performance of operations including receiving a call; selecting a next carrier to handoff the call; generating a call data record (CDR) for the handoff to the next carrier; encrypting the CDR using a call encryption key, thereby creating an encrypted CDR; encrypting the encrypted CDR using a committee encryption key, thereby creating a double encrypted CDR; recording the (Continued)

double encrypted CDR to a blockchain; and sending the call encryption key to the next carrier. Other embodiments are disclosed.

20 Claims, 9 Drawing Sheets

(51) Int. Cl.
*H04L 9/32* (2006.01)
*H04L 9/00* (2022.01)

(58) Field of Classification Search
CPC ... H04L 9/14; H04L 2209/56; H04L 2209/80; H04W 12/00
See application file for complete search history.

(56) References Cited

U.S. PATENT DOCUMENTS

| | | | | |
|---|---|---|---|---|
| 6,636,721 | B2* | 10/2003 | Threadgill | H04B 7/18539 |
| | | | | 455/12.1 |
| 6,779,030 | B1* | 8/2004 | Dugan | H04Q 3/0037 |
| | | | | 379/221.08 |
| 7,181,505 | B2* | 2/2007 | Haller | A61N 1/08 |
| | | | | 709/219 |
| 9,674,163 | B1* | 6/2017 | Feudo | H04L 9/3263 |
| 2001/0012775 | A1* | 8/2001 | Modzelesky | H04W 12/06 |
| | | | | 455/430 |
| 2018/0227428 | A1* | 8/2018 | Johanning | H04L 65/1023 |
| 2022/0360433 | A1 | 11/2022 | Srivastava et al. | |

* cited by examiner

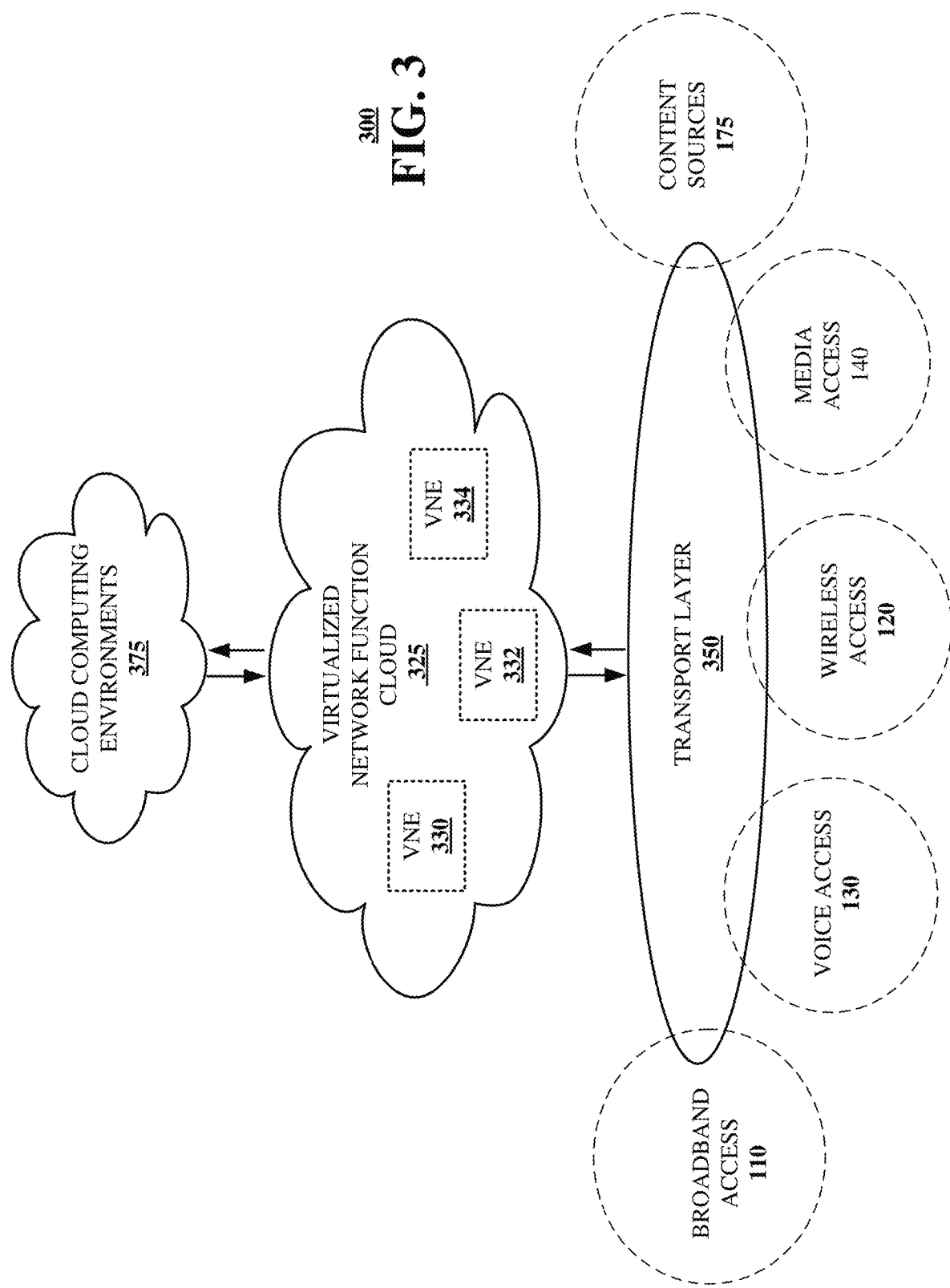

SYSTEM AND METHOD FOR MITIGATING INTERNATIONAL REVENUE SHARE FRAUD

CROSS REFERENCE TO RELATED APPLICATIONS

This application is a continuation of and claims the benefit of U.S. patent application Ser. No. 17/315,620 filed on May 10, 2021, entitled "SYSTEM AND METHOD FOR MITIGATING INTERNATIONAL REVENUE SHARE FRAUD," the contents of which are hereby incorporated by reference herein.

FIELD OF THE DISCLOSURE

The subject disclosure relates to a system and method for mitigating international revenue share fraud.

BACKGROUND

In an international call, the call is transferred through a sequence of carriers, from a caller to a callee. The caller pays the first carrier for the call, and in each handoff, the sending carrier pays the receiving carrier for handling the call and passing the call to the next carrier.

International Revenue Share Fraud (IRSF) is one of the most prevalent frauds plaguing the telecommunication industry. A survey from 2017, conducted by the Communications Fraud Control Association1 (CFCA), estimated that the revenue losses due to IRSF, for telecommunication companies worldwide, exceeded $10 B yearly. IRSF occurs when a fraudulent international phone call is made and the fraudster, or an associate of the fraudster, is paid a portion of the cost of terminating the call. IRSF often entails an artificial inflation of traffic, i.e., traffic-pumping to international premium rate numbers (IPRN) or switching international calls to a fraudster carrier who drops the call yet gets paid. The revenues of the premium number holder or of the carrier are shared with the fraudster. For instance, a PBX box can be hacked to issue many calls to the premium number, or via a carrier that participates in the fraud. In the worst case, the fraudulent calls are often exceptionally long, because calls to a premium rate number are billed by duration of the call. In the second case, there is typically a high volume of noticeably short calls. These are calls that are short stopped by the fraudster carrier. The fraudster carrier receives a small fee for each call and profits from "handling" many short calls that are dropped, i.e., not delivered to any end user.

When fraud is discovered, the records that are related to the fraud need to be identified. This is costly and today requires human labor, in particular, contacting other carriers to get the data related to the calls involved in the fraud. That data is stored in the form of a Call Detail Record (CDR). Since each carrier stores the CDRs of calls it handles in its own proprietary database, there is no single database that provides an overview of how calls were handled end-to-end, along the entire route from the initiator of the call to the end receiver. Furthermore, there is no mutually agreed upon trusted central entity that maintains such a comprehensive database across all carriers.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for a system and method for mitigating revenue sharing fraud in international phone call systems. Other embodiments are described in the subject disclosure.

One or more aspects of the subject disclosure include a device, having a processing system including a processor; and a memory that stores executable instructions that, when executed by the processing system, facilitate performance of operations including receiving an international call; selecting a next carrier to handoff the international call; generating a call data record (CDR) for the handoff to the next carrier; encrypting the CDR using a call encryption key, thereby creating an encrypted CDR; encrypting the encrypted CDR using a committee encryption key, thereby creating a double encrypted CDR; recording the double encrypted CDR to a blockchain; and sending the call encryption key to the next carrier.

One or more aspects of the subject disclosure include a non-transitory, machine-readable medium, comprising executable instructions that, when executed by a processing system including a processor, facilitate performance of operations including receiving a call; selecting a next carrier to handoff the call; generating a call data record (CDR) for the handoff to the next carrier; encrypting the CDR using a call encryption key, thereby creating an encrypted CDR; encrypting the encrypted CDR using a committee encryption key, thereby creating a double encrypted CDR; recording the double encrypted CDR to a blockchain; and sending the call encryption key to the next carrier.

One or more aspects of the subject disclosure include a method of generating, by a processing system including a processor, a call data record (CDR) for a handoff of a call to a next carrier; generating, by the processing system, a call encryption key and a call decryption key; encrypting, by the processing system, the CDR using the call encryption key, thereby creating an encrypted CDR; encrypting, by the processing system, the encrypted CDR using a committee encryption key, thereby creating a double encrypted CDR; recording, by the processing system, the double encrypted CDR to a blockchain as authorized by a consensus protocol; and sending, by the processing system, the call encryption key and the call decryption key to the next carrier.

Figure 1:
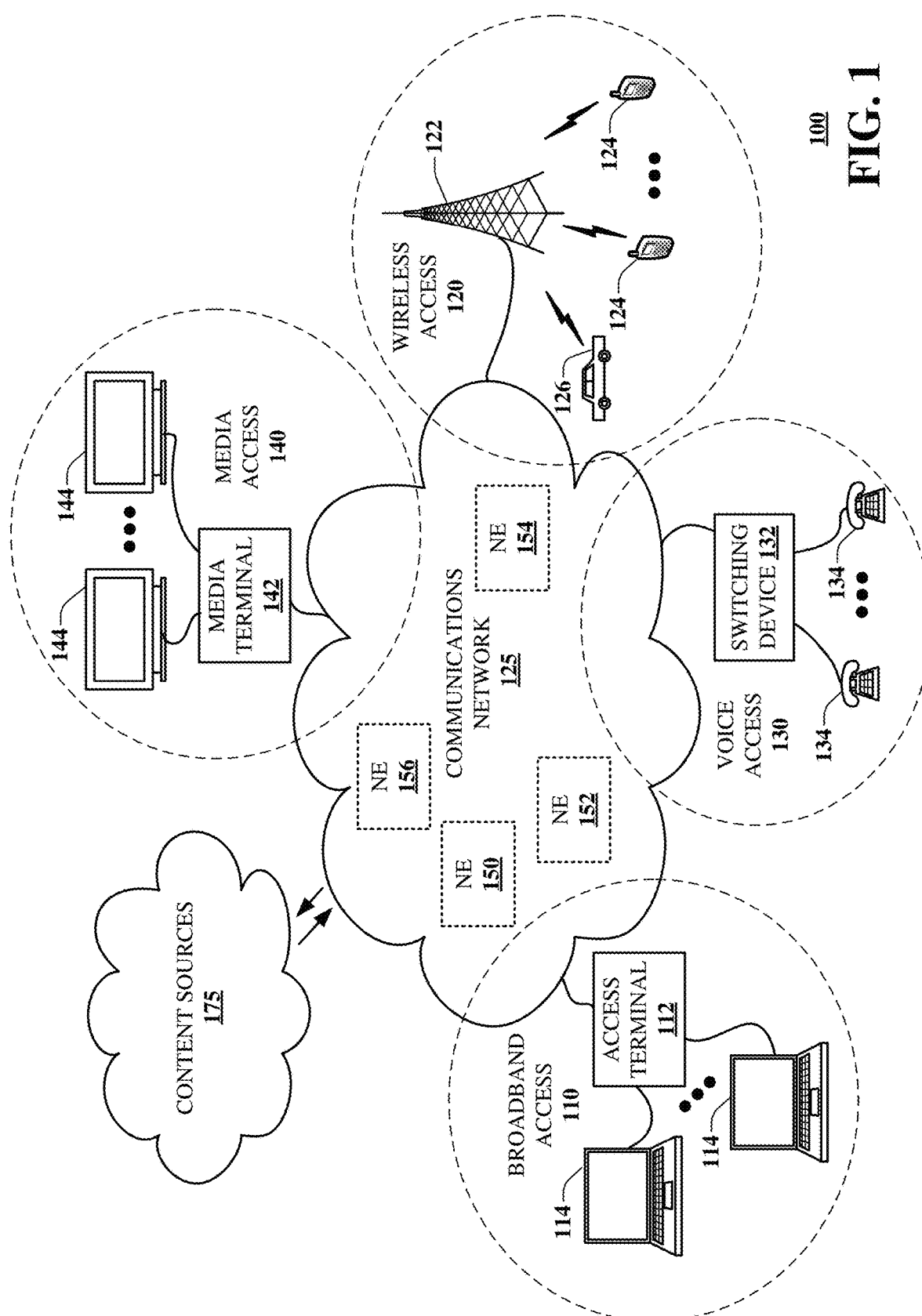
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part encrypting the CDR using a call encryption key and a committee encryption key, thereby creating a double encrypted CDR, recording the double encrypted CDR to a blockchain, and sending the call encryption key to the next carrier. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.1ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. Telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
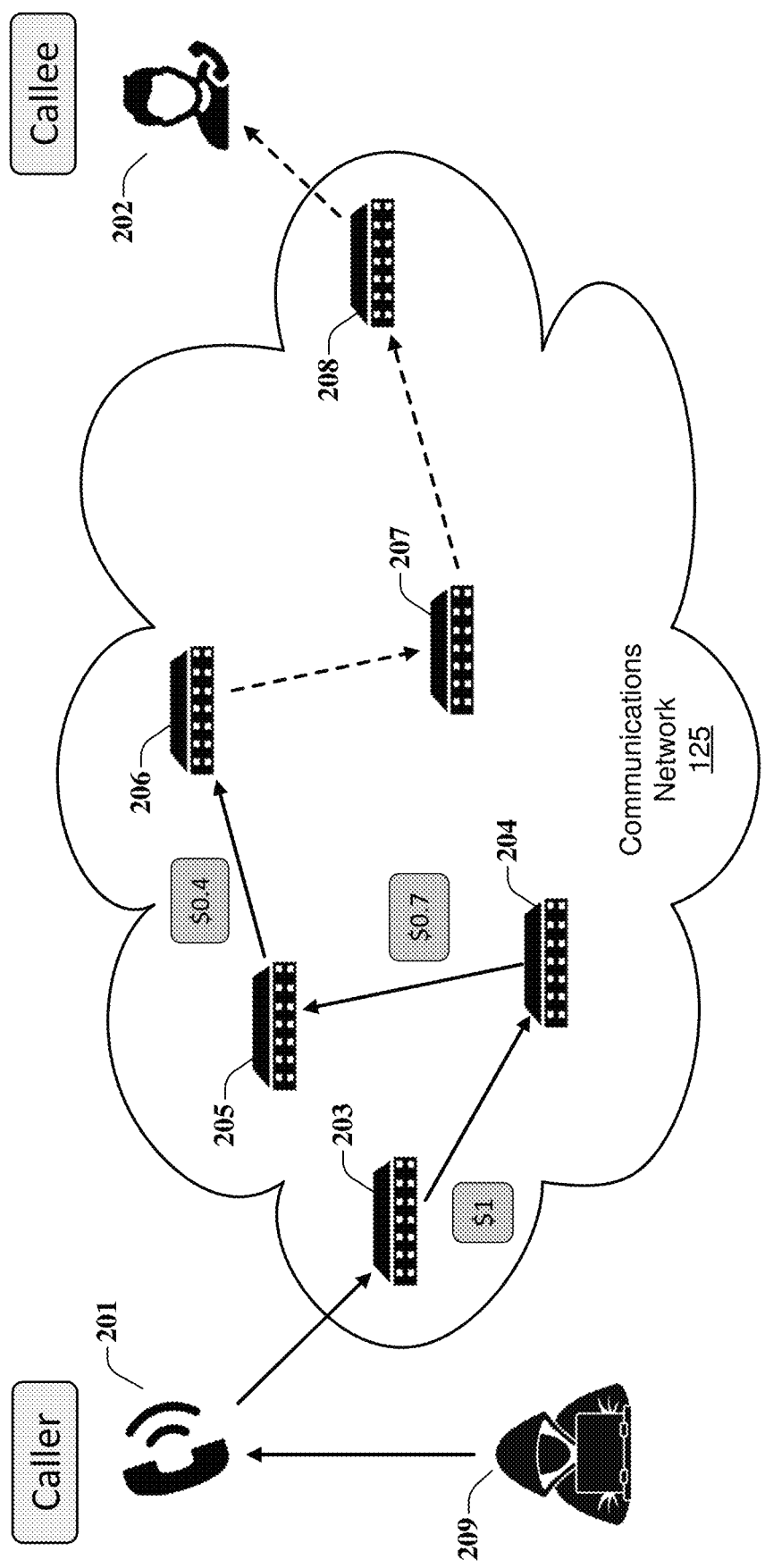
FIG. 2A is a block diagram illustrating an example, non-limiting embodiment of an international call in a communication network of FIG. 1 in accordance with various aspects described herein.

FIG. 2A is a block diagram illustrating an example, non-limiting embodiment of an international call in a communication network of FIG. 1 in accordance with various aspects described herein. As shown in FIG. 2A, a caller 201 places an international call to a callee 202. To help establish the call, the first carrier 203 of the caller determines a second carrier 204 and then hands over the call to the second carrier 204. In turn, the second carrier 204 identifies a third carrier 205 to establish the call. Likewise, the third carrier 205 finds a fourth carrier 206 to complete the call. This process of carrier selection continues with carrier 207 and ultimately to the callee's carrier 208. Caller 201 pays to their carrier 203 for the call (i.e., $1), and in each handoff, the sending carrier pays to the receiving carrier for handling the call and passing the call on to the next carrier or the callee 202 (e.g., $0.7, $0.4, etc.).

However, in a fraudulent call, a hacker 210 colludes with fourth carrier 206 to generate the call. Instead of passing the call along to a next carrier, fraudulent fourth carrier 206 short stops the call by dropping the call instead of passing it along. Typically, hacker 209 hacks a device of a customer, like a PBX, and generates fraudulent calls to the area where the fourth carrier 206 operates. The fourth carrier 206 commits fraud by dropping the call and shares the revenue with the hacker 209. The first carrier 203 loses money because it pays for the call (e.g., $1) but does not receive any payment from the customer. A typical burst of fraudulent calls can lead to substantial losses.

To reveal the fraudster carrier, suspicious calls are tracked to discover the carriers that were part of the route, and if a call was dropped, and the carrier that short-stopped the call. This requires access to information about the call. However, the information about each handover of the call is only stored in the databases of the involved carriers. Discovering the involved carriers, therefore, is an iterative and costly process. But the different carriers are competitors and may not fully trust each other or let other carriers manage such information for them.

To mitigate IRSF, the last carrier of suspected fraud calls (failed delivery) should be identified and made known to at least the first carrier. E.g., in the case of IRSF, identifying the last carrier could spare paying the fraudster carrier, and in the case of a technical failure, discover the carrier responsible. A registry system that records all the handoffs could help detect the failure point. But managing such a system is challenging given that the delivery system comprises of carriers that may not fully trust each other, e.g., competing telecommunications companies. The registry should be trustworthy and should not be controlled by any single carrier. In a registry system that is controlled by a single organization, the controlling organization can deny access to the information from other parties. In a registry system that has replicas stored on different nodes independently, it is difficult to guarantee that exactly the same information appears in all replicas.

Figure 2B:
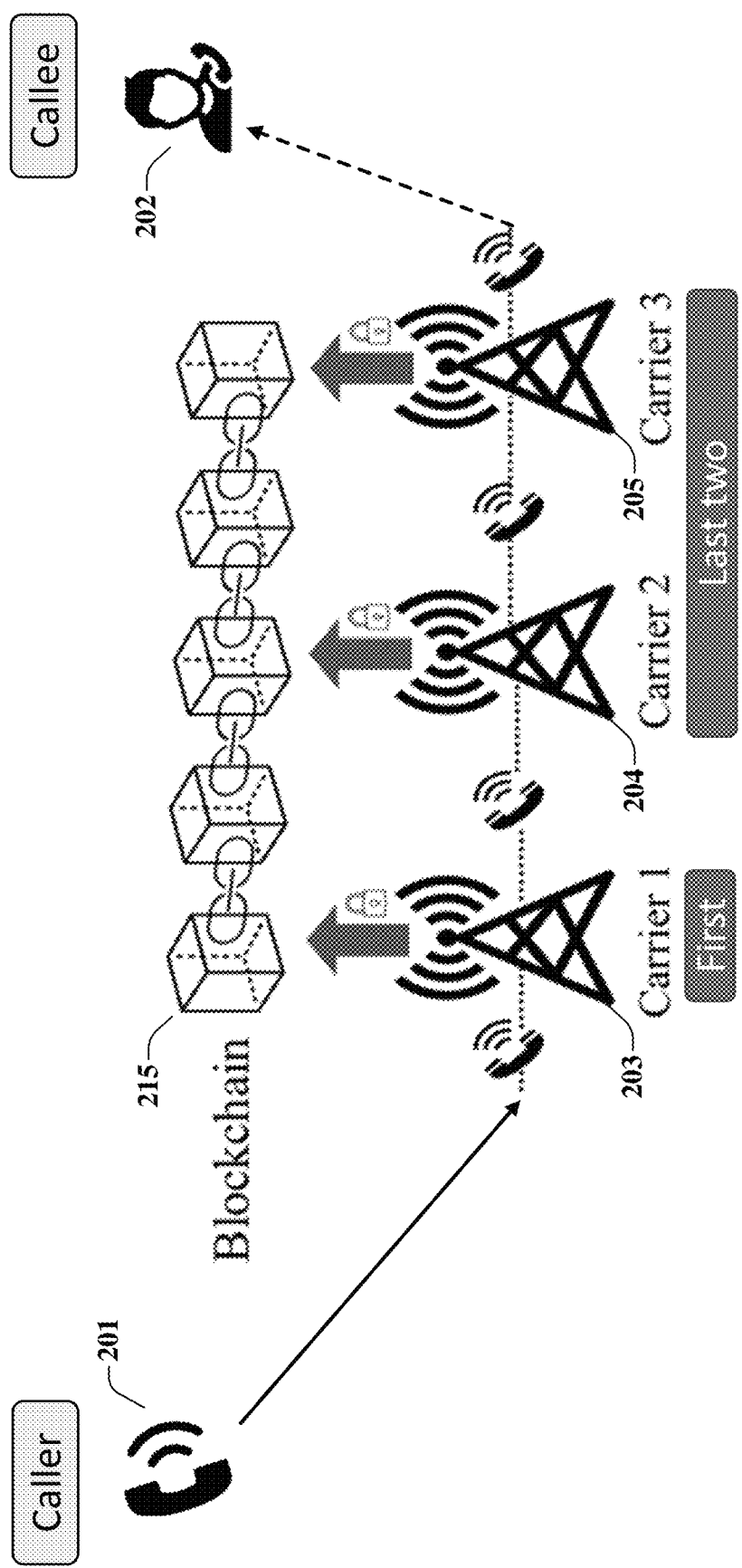
FIG. 2B is a block diagram illustrating an example, non-limiting embodiment of a system for tracking an international call in a communication network of FIG. 1 in accordance with various aspects described herein.

FIG. 2B is a block diagram illustrating an example, non-limiting embodiment of a system for tracking an international call in a communication network of FIG. 1 in accordance with various aspects described herein. As shown in FIG. 2B, when the first carrier 203 receives an international call from caller 201 to callee 202, first carrier 203 record handoff information about the call in a blockchain 215. In an embodiment, the handoff information includes identifiers for the call, the caller 201, callee 202, the first carrier 203 and the second carrier 204 (i.e., the next carrier). In an embodiment, such handoff information is included in a CDR.

Blockchain 215 provides a tamper-proof decentralized log of the delivery tasks and their execution, and these records can be used to track handoffs and discover points of failure, i.e., the carrier that dropped the call (or failed to handover an item). The peers to blockchain 215 are entities that were assigned to manage the blockchain. They can be carriers, but do not have to be carriers or end users.

In an embodiment, the blockchain 215 may be implemented as a permissioned version of Ethereum (https://ethereum.org/) with a Proof-of-Authority (PoA) consensus protocol. However, any other blockchain system or any other consensus protocol can be used for the decentralized trusted storage of handoff CDRs. In PoA, a small set of trusted validators create the blocks. In each round, a leader is selected randomly from the set of validators. The leader suggests a block. If the block is approved by the majority of the validators, it is added to blockchain 215. Otherwise, the leader is considered malicious and removed from the set of validators. PoA has a high throughput (transaction rate) in comparison to common consensus protocols like proof of work (PoW), however, it is considered less secure than PoW. Scalability may be improved, e.g., by chain partitioning. See, e.g., Dasu, Tamraparni et al., "Unchain your blockchain," Proc. Symposium on Foundations and Applications of Blockchain, pages 16-23 (2018), which is incorporated by reference herein.

In the case of a decentralized delivery system like international calls, blockchain 215 provides a trusted central database of all the transactions. Many blockchains are transparent, in the sense that the transactions are visible to all the peers and may be visible to other users. In some applications, like cryptocurrencies, such visibility is desired. However, the handoff information recorded in blockchain 215 may reveal sensitive business information, and thus should be safeguarded. Therefore, the handoff information should only be revealed when necessary, i.e., in the case of a fraud, and only to the aggrieved carriers that are affected by the fraud. Hence, the carrier encrypts the handoff information recorded in each block to prevent leakage of sensitive information.

Figure 2C:
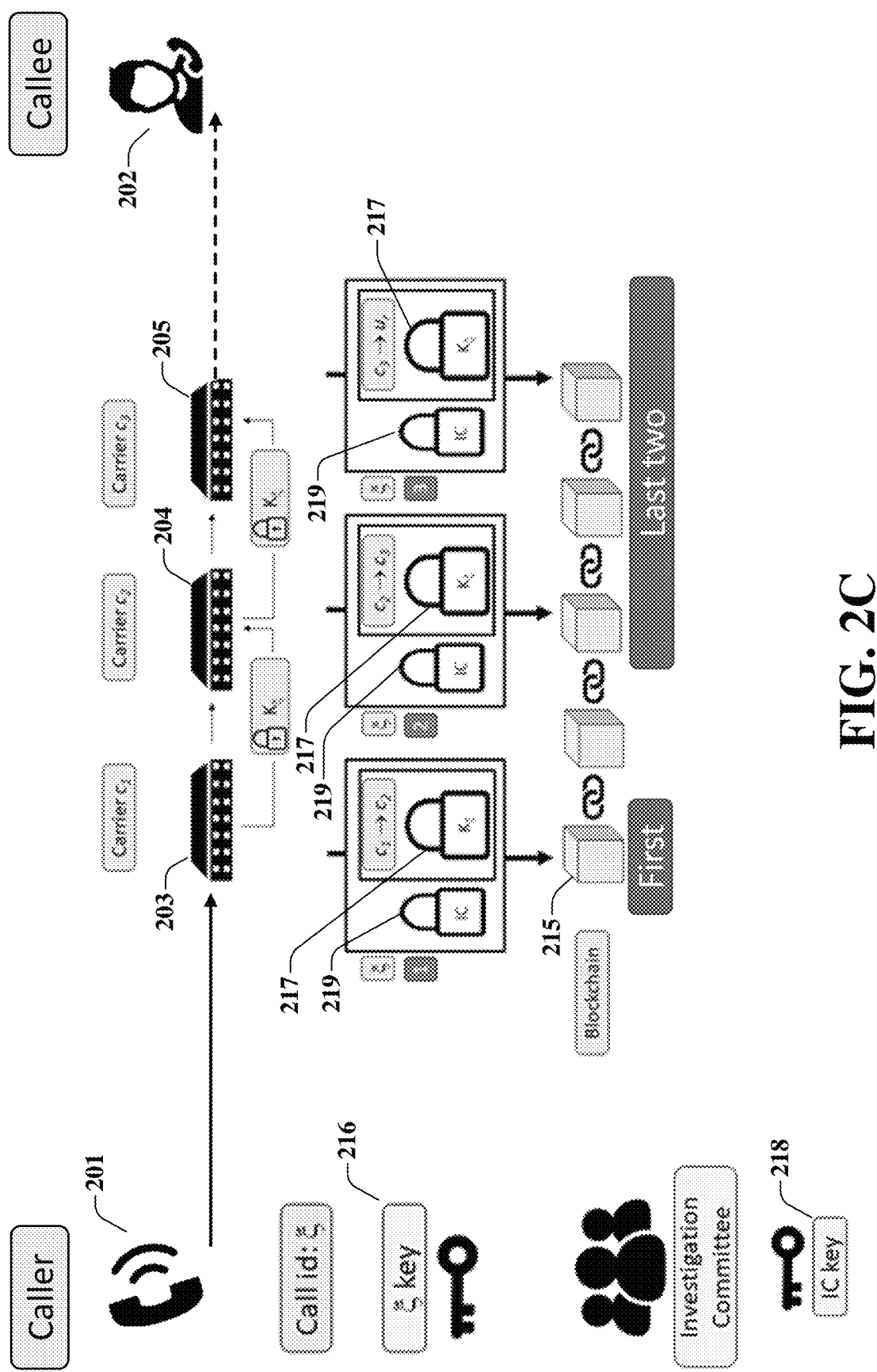
FIG. 2C is a block diagram illustrating in more detail an example, non-limiting embodiment of a system for tracking an international call in a communication network of FIG. 1 in accordance with various aspects described herein.

FIG. 2C is a block diagram illustrating in more detail an example, non-limiting embodiment of a system for tracking an international call in a communication network of FIG. 1 in accordance with various aspects described herein. Blockchain 215 provides transparency, where all the peers that manage the blockchain see the stored transactions. This is an advantage in many applications. However, there is a conflict between transparency and business confidentiality. Carriers may not want information about their handoffs to be revealed to their competitors.

To achieve business confidentially, the following two general guidelines should be applied: (a) minimize the exposed information, and (b) minimize the number of access permissions. Information should only be revealed when necessary and only to entities that need to see the information. When minimizing the exposed information, the goal is to reduce the number of handoffs that are revealed to a third party. An example of such a restriction is to only reveal transactions that are part of a failed delivery. When minimizing the number of viewers, the set of carriers (or other entities) that are privy to the disclosed information should be as small as possible. For example, if a carrier does not participate in a delivery, it should not be exposed to information about that delivery.

As shown in FIG. 2C, business confidentiality is maintained for each CDR generated by a handoff using double encryption by two keys before being stored in blockchain 215. Using public key encryption (PKI), the first key pair comprises a private key $\xi$ 216 and a public key $K_\xi$ 217, used to perform the first encryption of the CDR. There are two cases for implementing the first key pair. In the first case, the information of each CDR should only be revealed to the first carrier. The first key pair consists of the private key $\xi$ 216 of the first carrier (which is not revealed to any other carrier) and the matching public key $K_\xi$ 217 (which is revealed to all and is used for encrypting the CDRs). In a second case, the information should be revealed to all the carriers on the route of the call. In this second case, the first carrier creates a new symmetric key. This key is securely passed to all the carriers along the route, together with the call, and this key can be used to decrypt the information if needed (after the decryption by the committee). In the second case, the first key pair is generated using the call identifier $\xi$. In the first case where the public key of the first carrier is used for encryption, there is no need to generate a new pair of keys for every call.

A second key pair comprising a private IC key 218 and a public key IC 219, which is used to encrypt the public key $K_\xi$ 217 encrypted CDR. Only the public key IC 219 of the IC is used for the encryption by the carriers. The private IC key 218 is kept secret and it is only known to the IC. The private IC key 218 is used for decryption of the information if the IC decides to do so.

As each handoff occurs, the carrier passes along the public key $K_\xi$ 217 to the next carrier, so that the next CDR can be encrypted and recorded in the blockchain 215. In the case where information is only revealed to the first carrier, the first encryption is using the public key of the first carrier. This public key can be revealed because it is public. Only the first carrier has the matching key and can decrypt the information.

When a failed delivery occurs, the first carrier notifies an investigation committee (IC), which has control over the private IC key 218 and is responsible for deciding when information should be revealed. The IC consists of several independent entities. The IC can be trusted to decide when information should be revealed but should not see any confidential information. The IC can be a proxy that executes a court order or can be some other group of semi-trusted entities. It can be implemented as a single node, as a distributed system with a consensus protocol, by the blockchain peers, etc. In an embodiment, IC decrypts at least the last two CDRs recorded in the blockchain, thereby making the last two records available for decryption by all of the carriers holding the private key $\xi$ 216. If the inner decryption is with the public key of the first carrier, then only the first carrier can decrypt the information because only this carrier holds the matching private key. If the information should be revealed to all the carriers on the call's route, the inner decryption is by using the key of the call and all the carriers that have this key can decrypt the information, however, this will be a symmetric key passed securely, not a private key.

The IC makes the last two CDRs available because a fraudulent carrier may add a fake record to the blockchain 215 that the call was forwarded to another carrier, in an effort to cover their tracks. However, the CDR noting the transfer of the call to the fraudulent carrier would have been properly recorded by the previous carrier.

In an embodiment, when the IC consists of several entities, deciding when to decrypt records should be based on a consensus protocol, e.g., some minimum number of members of the IC could authorize decryption of records on the blockchain, but a smaller subset would not be able to do so. This can be implemented using a shared secrets mechanism, such as Shamir's secret sharing. See, e.g., Shamir, Adi, "How to share a secret," Commun. ACM, 22(11):612-613 (November 1979), which is incorporated by reference herein.

Typically, the majority of the carriers are honest, but even the honest carriers should not be privy to confidential information (i.e., the handoffs of other carriers). In another embodiment, IC decrypts all the CDRs for a particular call recorded in the blockchain 215, thereby making all the records of the particular call available to all of the carriers participating in handling the particular call. In yet another embodiment, since the first carrier is the party most financially impacted by the fraud, the first carrier maintains the private key $\xi$ 216 for the call and does not pass this key to the subsequent carriers, so that only the first carrier has access to the CDRs decrypted by the IC. Alternatively, the first carrier can provide the private key $\xi$ 216 to other carriers recording CDRs to the blockchain 215, perhaps to help raise the level of awareness of the identity of the fraudulent carrier. In another embodiment, a symmetric key is passed to all the carriers handling the call, instead of a private key.

Another reason to share the information with the other carriers handling the call is to negotiate a reduced payment for calls that are part of a fraud because there is no paying customer. In this case, some of the losses could be spread among the carriers instead of being levied against the first carrier. Further, the carriers would become aware of the identity of the fraudulent carrier and any associated carrier(s).

In an embodiment, the foregoing disclosure can be applied to any revenue sharing supply chain transaction for goods or services where information concerning each handoff can be recorded to a blockchain and a risk of fraud or theft of goods or services may occur.

Because of their expense, international calls attract fraudsters committing IRSF. In domestic calls or video calls the cost is typically too low to make fraud worthwhile. In an embodiment, the suggested handoff-tracking technique can be applied to any case where there is a delivery via a sequence of handoffs. For example, shipping companies delivering packages, tracking packet switching and handling of network flows on the Internet, tracking delivery of emails, tracking delivery in supply chains, etc. In all these cases, the information about handoffs can remain concealed if no frauds are committed but can be revealed if a package/packet/call/item is dropped, lost or stolen. In general, the aforementioned technology can be used to track handoffs in a decentralized system while maintaining business confidentiality.

Figure 2D:
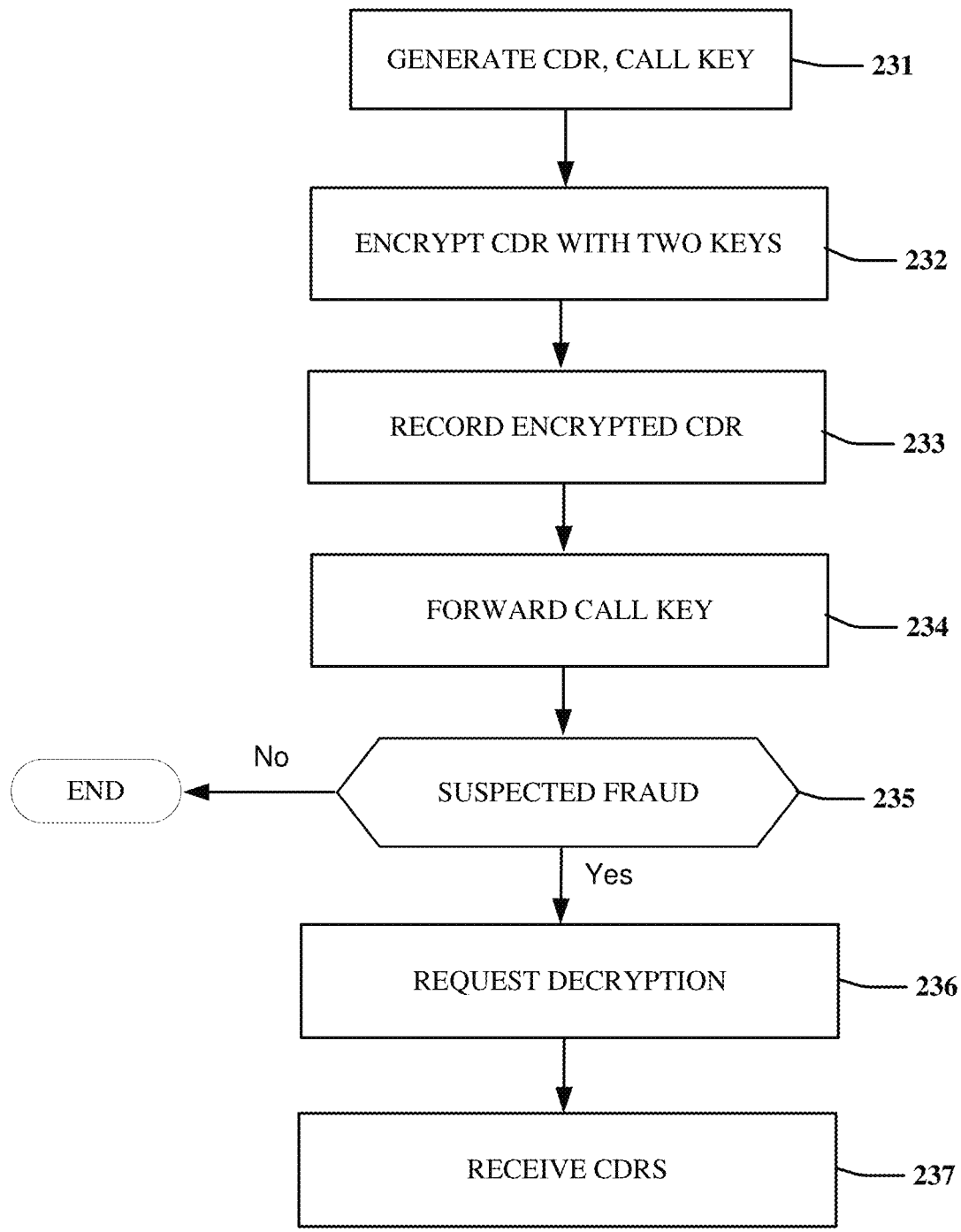
FIG. 2D depicts an illustrative embodiment of a method in accordance with various aspects described herein.

FIG. 2D depicts an illustrative embodiment of a method in accordance with various aspects described herein. As shown in FIG. 2D, method 230 begins in step 231 where a processing system including a processor, generates a call data record (CDR) for a handoff of a call to a next carrier, as well as a call encryption key and a call decryption key. In the case where there is a symmetric key that is shared with all the carriers along the route, the symmetric key is generated by the first carrier, not by other carriers. In the alternative case where the public key of the first carrier is used for the encryption, there is no need to generate a new pair of public and private keys for each call. The same key pair of the first carrier can be used for many calls because the private key is kept secret.

Next, in step 232, the processing system encrypts the CDR using the call encryption key, thereby creating an encrypted CDR, and also encrypts the encrypted CDR using a committee encryption key, thereby creating a double encrypted CDR. Next, in step 233, the processing system records the double encrypted CDR to a blockchain, as permitted by a consensus protocol among blockchain peers.

Then, in step 234, the processing system securely forwards the call encryption key to the next carrier. Note that a symmetric key can be used for both encryption and decryption. Alternatively, a key pair of encryption and decryption keys can be sent but would be unnecessary if a symmetric key is used. If the public key of the first carrier is used to encrypt CDRs (in the case that CDR information is only revealed to the first carrier), then a public key can be passed on transparently.

In step 235, the processing system checks for potential fraud, due to high call rates and failed calls. If no fraud is suspected, then the process ends. However, if there is a potential fraud, the process continues to step 236, where the processing system submits a fraud request for decryption of the CDRs recorded in the blockchain for the call to an entity possessing a committee decryption key. In an embodiment, the entity comprises a set of members of a committee.

Then, in step 237, responding to the request, an agreement of perhaps less than all members of the committee would allow the information to be decrypted. In such case, the processing system receives at least the two last records recorded in the blockchain for the call, wherein the last two records are decrypted by the committee decryption key responsive to sending the fraud request.

While for purposes of simplicity of explanation, the respective processes are shown and described as a series of blocks in FIGS. 2A, 2B, 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In another embodiment, the techniques described above can be used for mitigating "OTT bypass frauds" (in addition to IRSF). OTT bypass fraud occurs when carriers reroute the call though a low-quality inexpensive VoIP route but charge as if the call has been delivered through a high-quality line, knowing the carriers can help discovering the fraudster.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, 2D and 3. For example, virtualized communication network 300 can facilitate in whole or in part encrypting the CDR using a call encryption key and a committee encryption key, thereby creating a double encrypted CDR, recording the double encrypted CDR to a blockchain, and sending the call encryption key to the next carrier.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and overall, which creates an elastic function with higher availability than its former monolithic version. These virtual network elements 330, 332, 334, etc. can be instantiated and managed using an orchestration approach similar to those used in cloud computer services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
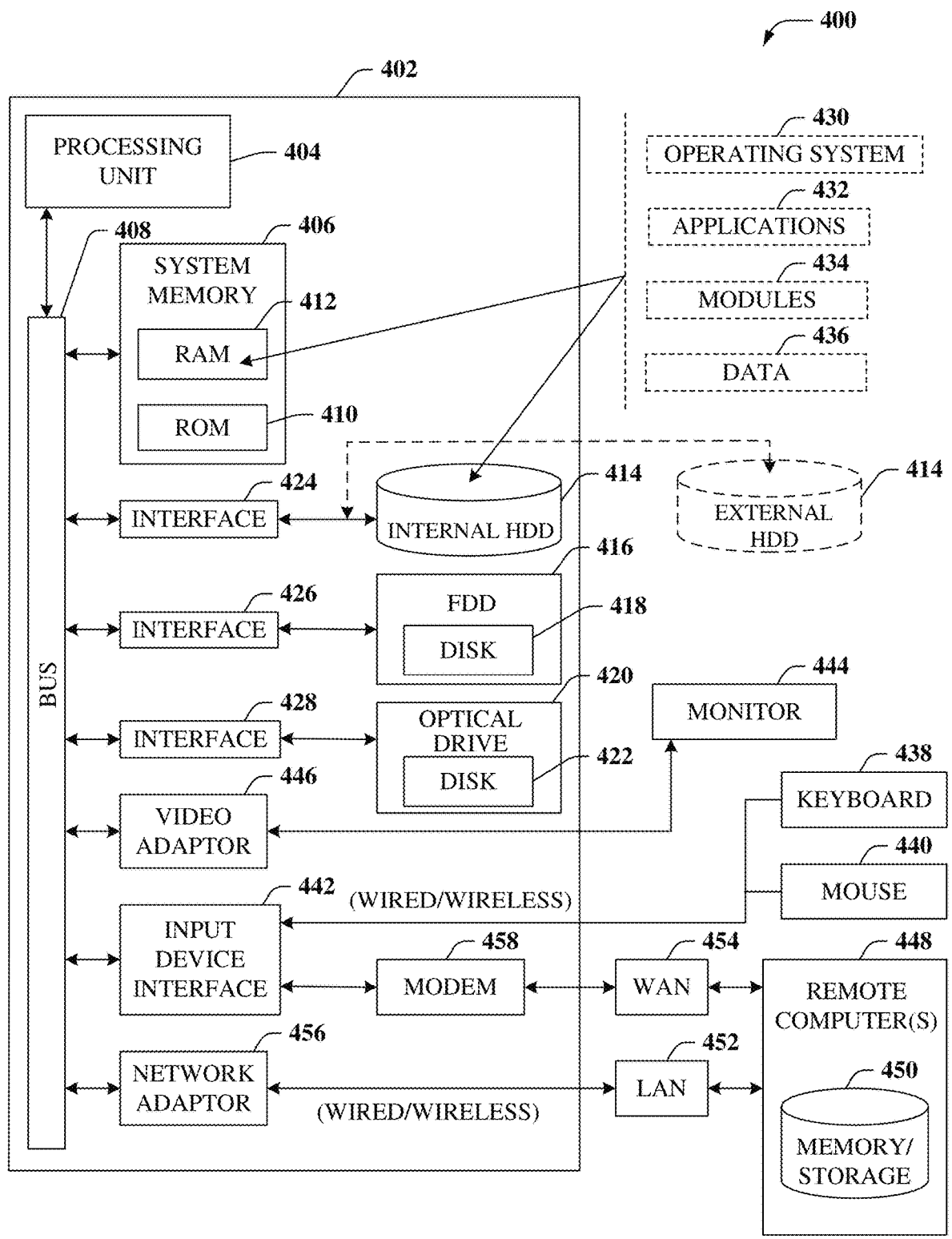
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part encrypting the CDR using a call encryption key and a committee encryption key, thereby creating a double encrypted CDR, recording the double encrypted CDR to a blockchain, and sending the call encryption key to the next carrier.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. System memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. Modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
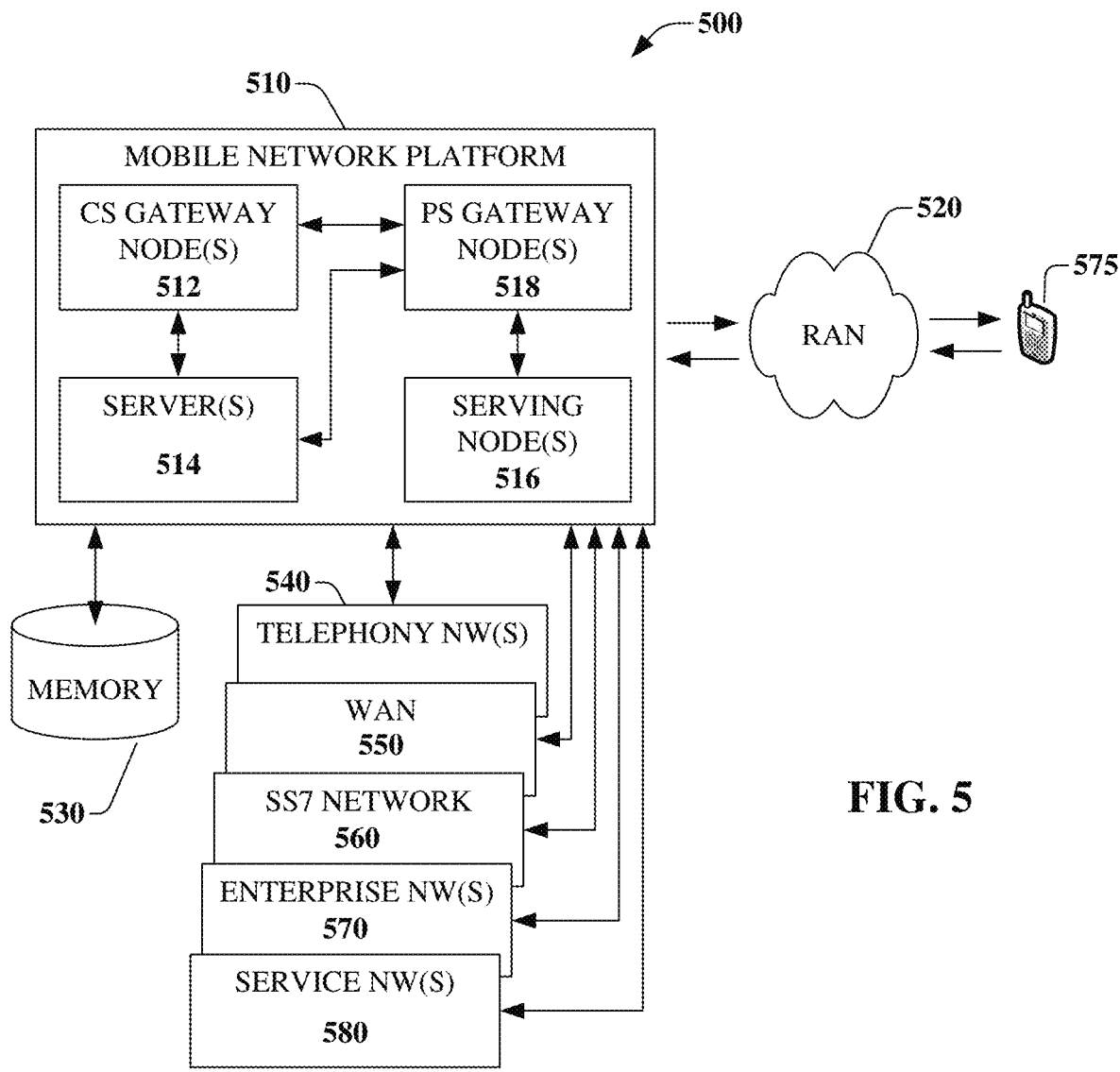
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part encrypting the CDR using a call encryption key and a committee encryption key, thereby creating a double encrypted CDR, recording the double encrypted CDR to a blockchain, and sending the call encryption key to the next carrier. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
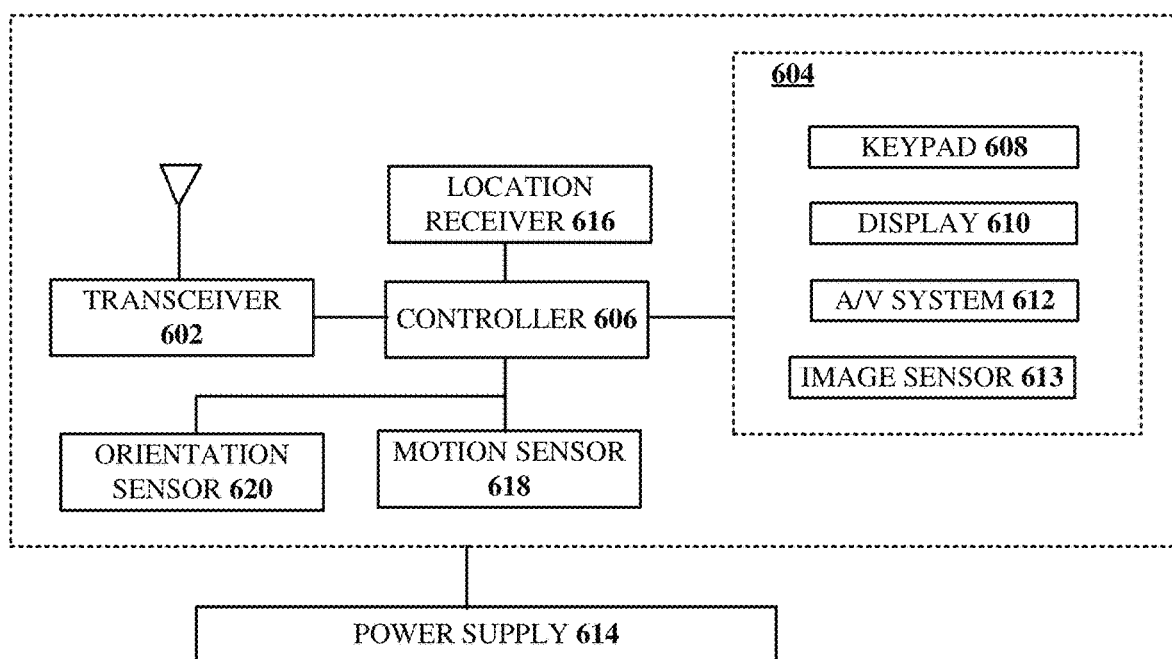
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part encrypting the CDR using a call encryption key and a committee encryption key, thereby creating a double encrypted CDR, recording the double encrypted CDR to a blockchain, and sending the call encryption key to the next carrier.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. Display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
  a processing system including a processor; and
  a memory that stores executable instructions that, when executed by the processing system, facilitate performance of operations, the operations comprising:
  encrypting a call data record (CDR) for an international call received, using a call encryption key, thereby creating an encrypted CDR, wherein the international call will be handed off to a next carrier; and
  encrypting the encrypted CDR using a committee encryption key, thereby creating a double encrypted CDR, wherein the call encryption key is provided to the next carrier.

2. The device of claim 1, wherein the operations further comprise generating the call encryption key and a call decryption key and sending the call decryption key to the next carrier.

3. The device of claim 1, wherein the operations further comprise generating a symmetric call encryption key.

4. The device of claim 1, wherein the operations further comprise submitting a fraud request to an entity possessing a committee decryption key.

5. The device of claim 4, wherein the operations further comprise recording the double encrypted CDR to a blockchain as permitted by a consensus protocol.

6. The device of claim 5, wherein the operations further comprise receiving two last records of a call recorded in the blockchain for the international call, wherein the last two records are decrypted by the committee decryption key responsive to sending the fraud request.

7. The device of claim 5, wherein the operations further comprise receiving all encrypted records recorded in the blockchain for the international call, wherein all CDRs are decrypted by the committee decryption key responsive to sending the fraud request.

8. The device of claim 7, wherein at least a minimum number of members of the entity have authorized decryption of the CDRs for the international call using a shared secrets mechanism.

9. The device of claim 1, wherein the processing system comprises a plurality of processors operating in a distributed computing environment.

10. A non-transitory, machine-readable medium, comprising executable instructions that, when executed by a processing system including a processor, facilitate performance of operations, the operations comprising:
    encrypting a call data record (CDR) for handoff of an international call to a next carrier, wherein the CDR is encrypted using a call encryption key, thereby creating an encrypted CDR; and
    encrypting the encrypted CDR using a committee encryption key, thereby creating a double encrypted CDR, wherein the call encryption key is provided to the next carrier.

11. The non-transitory, machine-readable medium of claim 10, wherein the CDR comprises: identifiers for the international call, a caller, a callee, a carrier, the next carrier, a time and date, or a combination thereof.

12. The non-transitory, machine-readable medium of claim 11, wherein the operations further comprise generating the call encryption key and a call decryption key.

13. The non-transitory, machine-readable medium of claim 12, wherein the operations further comprise sending the call decryption key to the next carrier.

14. The non-transitory, machine-readable medium of claim 13, wherein the operations further comprise recording the double encrypted CDR to a blockchain as authorized using a consensus protocol.

15. The non-transitory, machine-readable medium of claim 14, wherein the operations further comprise submitting a fraud request to an entity possessing a committee decryption key.

16. The non-transitory, machine-readable medium of claim 15, wherein the operations further comprise receiving two last records recorded in the blockchain for the international call, wherein the last two records are decrypted by the committee decryption key responsive to sending the fraud request.

17. The non-transitory, machine-readable medium of claim 16, wherein at least a minimum number of members of the entity have authorized decryption of CDRs for the international call using a shared secrets mechanism.

18. The non-transitory, machine-readable medium of claim 17, wherein the processing system comprises a plurality of processors operating in a distributed computing environment.

19. A method, comprising:
    encrypting, by a processing system including a processor, a call data record (CDR) for a handoff of a call to a next carrier using a call encryption key, thereby creating an encrypted CDR; and
    encrypting, by the processing system, the encrypted CDR using a committee encryption key, thereby creating a double encrypted CDR, wherein the call encryption key and a call decryption key are provided to the next carrier.

20. The method of claim 19, further comprising:
    submitting, by the processing system, a fraud request to an entity possessing a committee decryption key; and
    receiving, by the processing system, two last records, wherein the last two records are decrypted by the committee decryption key responsive to sending the fraud request.

* * * * *